Figure 1:
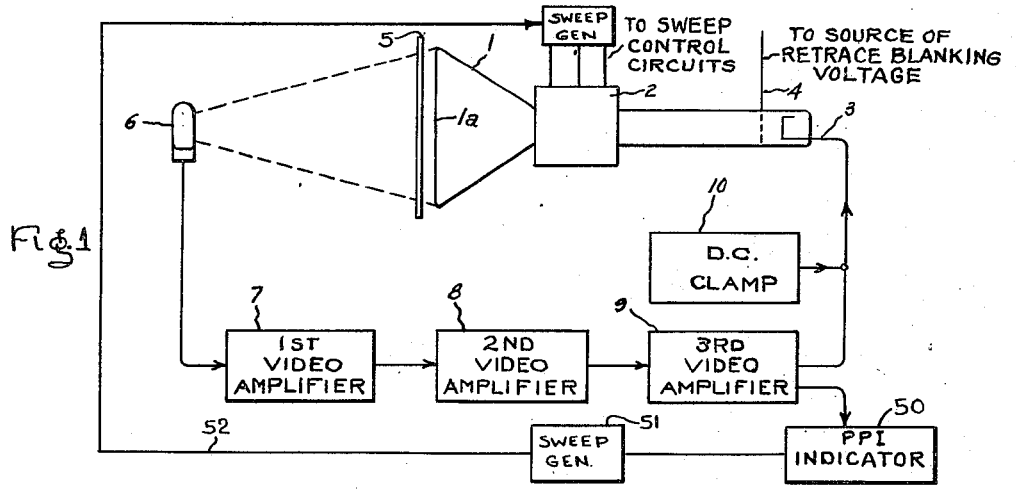

Sept. 26, 1950  J. E. RANKS  2,523,328
CATHODE-RAY MAPPING SYSTEM
Filed June 30, 1948

Inventor:
John E. Ranks,
by (signature)
His Attorney.

Patented Sept. 26, 1950

2,523,328

UNITED STATES PATENT OFFICE 2,523,328

CATHODE-RAY MAPPING SYSTEM

John E. Ranks, Syracuse, N. Y., assignor to General Electric Company, a corporation of New York Application June 30, 1948, Serial No. 36,230

6 Claims. (Cl. 315—10)

My invention relates to a cathode ray mapping system and, more particularly, to a cathode ray projection system providing an electronic map presentation adapted to combine both radar and graphical information.

In radar presentation systems, it is often desirable to coordinate a plan position indication of radar echoes, commonly called a "PPI" type of presentation, with an indication providing a map of the area in which echoes may be located. This may be done by placing a transparent map directly over the screen of the cathode ray tube. However, this has the disadvantage in that if it is desired to expand the radar range scale, it is necessary to change maps in order that the scale of the map be the same as that of the radar range scale. In order to overcome this difficulty, a system of electronic mapping has been used in which a transparent map is positioned between a cathode ray tube and a photoelectric cell. The cathode ray tube is operated in synchronism with the plan position indicator, or PPI tube, on which the map and radar signals are to be concurrently displayed. No video signals are applied to the scanning tube and the cathode ray is maintained at full intensity throughout each scan. The photoelectric cell picks up the light from the scanning tube, after it has passed through the map, and converts it to electrical or video signals, modulated in accordance with the light transmitting characteristics of the map. These signals are then mixed with the radar signal and are displayed on the PPI tube. Now, if the radial sweep rate of the PPI tube is varied to change the range scale, the map scale will be correspondingly varied along with the range scale, thereby eliminating replacing of maps.

In this general type of electronic mapping system, considerable difficulty has heretofore been caused by non-uniformity of the cathode ray tube phosphor, by variations in the spot intensity and by non-uniformity of the photoelectric cell sensitivity. It is an object of my invention to provide improved means for electronic mapping overcoming these difficulties.

Another object of my invention is to provide a cathode ray mapping system including improved means for mixing radar and graphical information.

Another object of my invention is to provide means to compensate for non-uniformity in the phosphor of cathode ray tubes used in electronic mapping.

A further object of my invention is to provide an improved system of electronic mapping to produce a uniform map signal.

The features of my invention, which I believe to be novel, are set forth with particularity in the appended claims. My invention itself however, together with other objects and advantages thereof, may best be understood by reference to the following description taken in conjunction with the accompanying drawing in which, Fig. 1 is a block diagram in which an embodiment of my invention is incorporated; and Fig. 2 is a circuit diagram of the system shown in Fig. 1.

Referring now to Fig. 1, I have shown a conventional type of cathode ray tube 1 having deflection yoke 2, cathode 3 and intensity control grid 4. Deflecting potentials are applied to yoke 2 from sweep control circuit 49 to cause the ray to trace a predetermined raster or pattern on fluorescent screen 1a on the tube face. The manner of sweep will be discussed shortly in greater detail. Mounted just in front of the face of tube 1 is a transparent map 5 having opaque or semi-opaque lines, or other indicia to be reproduced, marked thereon. A photoelectric tube 6 is mounted by suitable means in front of the map 5 to pick up the light from the tube 1 which passes through the map 5. The output of the tube 6 is amplified by three stages of video amplification 7, 8 and 9. A portion of the output from the third stage 9 is fed back to the cathode 3 of the tube 1. A direct current clamp circuit 10 is used to keep the unidirectional potential at the proper level. Usually the tube 1, map 5 and photoelectric cell 6, will be enclosed in a light-tight enclosure (not shown) in order to prevent light from other sources from impinging on the photoelectric cell and causing false signals.

Figure 2:
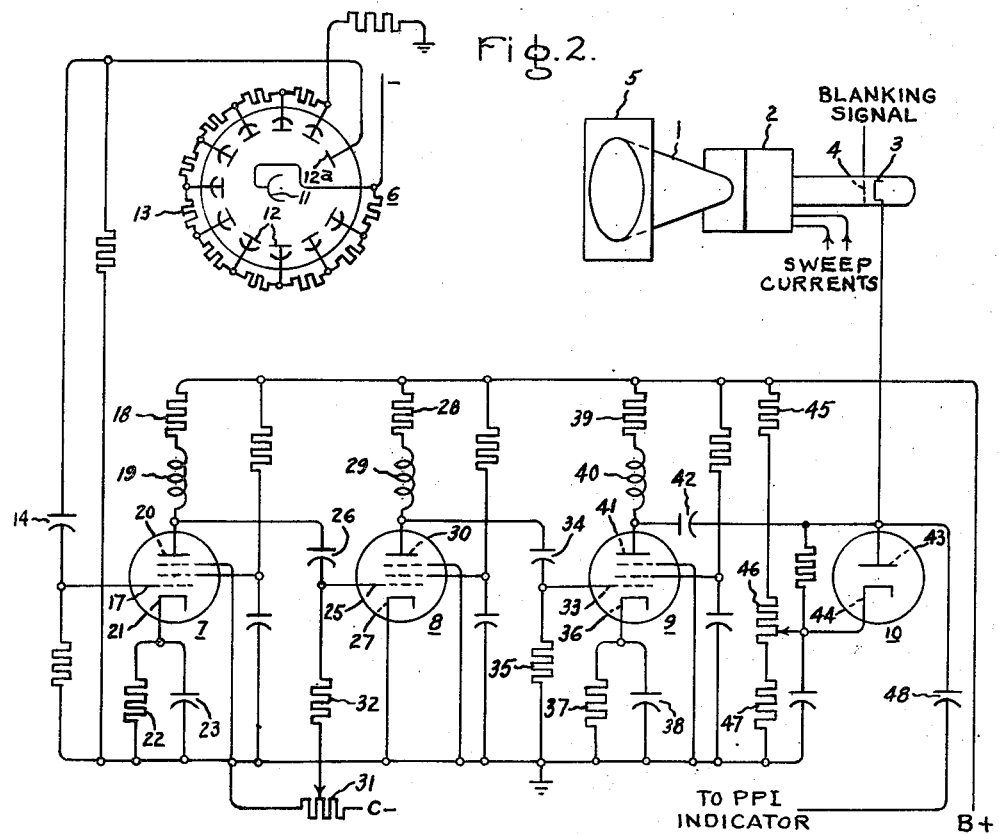

Referring now to Fig. 2, the photoelectric tube 6 is illustrated as being of the conventional photo-multiplier type having a cathode 11, which is connected to a suitable source of negative bias potential (not shown), and a plurality of anodes 12. All anodes except the output anode 12a are connected to tapped points on a voltage divider 13 in known manner.

The output anode 12a of the tube 6 is connected to the control grid 17 of the first video amplifier stage 7 by means of coupling capacitor 14. Anode potential is supplied to the device 7 from a suitable high voltage supply, conventionally indicated by the symbol B+, through a resistor 18 and inductance 19 to the anode 20. The cathode 21 is self-biased by resistor 22 and is by-passed to ground by capacitor 23.

The output of the device 7 is connected to the control grid 25 of second video amplifier stage 8 through a capacitor 26. Cathode 27 of this stage is directly connected to ground, and anode potential is supplied from the conventional B+ supply through the resistor 28 and choke 29 to anode 30. A gain adjustment is conventionally provided from a suitable C— supply (not shown) through resistors 31 and 32 which bias the grid 25 to a suitable negative potential.

The output from the anode 30 is connected to control grid 33 of the third video amplifier stage 9 by means of a capacitor 34. The control grid 33 is returned to ground by means of a resistor 35. Cathode bias is supplied through resistor 37 which is by-passed to ground by a capacitor 38. Anode potential for the device 9 is supplied from the conventional B+ supply through resistor 39 and choke 40, to anode 41. The output is connected from the anode 41 through a capacitor 42 to the anode 43 of the device 10, which is a clamp diode for maintaining the proper unidirectional potential on cathode 3 of tube 1. The cathode 44 is supplied through resistors 45, 46 and 47 from the B+ supply. The resistor 46 has a variable tap for regulating the voltage. A portion of the output is then connected to the cathode 3 of the device 1 thereby providing a suitable feedback path. The video output is connected to a suitable utilization device (not shown) by means of a capacitor 48.

In carrying out electronic mapping according to my invention, predetermined sweep voltages are applied to the cathode ray tube 1, Fig. 1, on which there is no video signal. Preferably, the sweep voltages for tube 1 will be synchronized with those which control the sweep of a PPI indicator 50 which will display the combined radar map signals. The receiver PPI tube and the means for synchronizing have been shown in block diagram form for simplicity as they are well known to the art. In a conventional form of map-like, or PPI display, pulse signals from a suitable radar receiver are impressed on the intensity control electrodes of a cathode ray tube to modulate the ray intensity. The ray is then caused to trace a radial sweep, under control of sweep generator 51, which rotates in synchronism with the scanning action of the radar transmitting antenna system. This may be accomplished by application of suitable sweep voltages to a deflecting yoke of PPI indicator 50 similar to that of tube 1. The same voltages may be applied over cable 52 to energize yoke 2 of the tube 1 to cause the cathode rays in the two tubes to scan in synchronism. Suitable radar transmitting, receiving and indicating equipment for producing this general type of map-like, or PPI display, are well known to the art and are not illustrated since they form no part of the present invention.

The photoelectric tube 6 is mounted a short distance from the map 5 to receive the light transmitted from the tube 1 that passes through the map 5. The photoelectric tube 6 converts the variations of light intensity to electrical signal variations or video signals. These signals are then amplified by the stages of amplification previously described. The gain of the system may be varied by adjusting the potentiometer 31 in the grid bias network of the second amplifier stage. The output of the final amplifier stage is divided into two channels. One channel supplies the video signals which may be used to reproduce the map on other cathode ray PPI tubes.

In accordance with my invention, the second channel supplies signals which are returned to the map scanning cathode ray tube 1 in the proper polarity in order to oppose or degenerate all variations in light intensity, as seen by the photoelectric tube, except those caused by the map lines. At the instant the scanning beam passes over an opaque map line, the instantaneous video voltage should be zero and no feedback voltage should be developed. The zero or reference level corresponds to the absence of light as seen by the photoelectric tube, a negative signal being produced when light strikes the tube. However, even when the ray is blocked, for example by an opaque line on screen 5, as a practical matter some light does reach the photoelectric tube, due to phosphor persistence or other causes, and a negative signal of proportional amplitude normally results. This is undesirable in that it reduces the definition by causing sloping instead of sharp leading and trailing edges on the video pulse produced by the rays traverse across a line.

By employing feedback, any irregularities in light intensity will cause some negative signal amplitude which, in turn, will produce a proportional feedback voltage that degenerates this unwanted signal. The degenerative feedback tends to maintain a constant video signal level in the absence of map lines and reduces undesired fluctuations in the signals caused by coarse phosphorus grain structure and by irregularities in the glass surface in the cathode ray tube as well as variations in the light intensity as seen by the photoelectric tube.

The degenerative feedback is taken from the last stage of video amplification and applied to a control element of a cathode ray tube. The clamp is included in this circuit to establish a unidirectional reference potential from the video signal excursions. This is necessary to maintain the average intensity level on the map scanning cathode ray tube constant.

In the embodiment illustrated, the feedback voltage is applied to the cathode element. A retrace blanking voltage may be applied to the control grid element of the cathode ray tube in a conventional manner. However, it is to be understood that the result would be the same if the feedback voltage were applied to the control grid and the blanking voltage to the cathode. However, the polarity of each signal would have to be reversed and the proper average unidirectional potential maintained between the cathode and control grid.

While I have illustrated three stages of video amplification, any suitable number of stages may, of course, be used. Also, it will be apparent to one skilled in the art that other modes of scanning than PPI may be used, such as interlaced scanning.

While I have illustrated and described particular embodiments of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A cathode ray mapping system comprising in combination, a cathode ray tube having a viewing screen, means for causing the cathode ray to scan said screen in a predetermined pattern, a transparency having opaque markings thereon, a photoelectric cell, means for projecting the light emitted by said screen through said transparency and upon said photoelectric cell, and a feedback path between said photoelectric cell and said cathode ray tube whereby variations in light intensity, as seen by said photoelectric cell due to irregularities in said screen, are substantially reduced.

2. A cathode ray mapping system, comprising, in combination, a cathode ray tube, a transparent map having opaque markings, a light sensitive device, means including said cathode ray tube for scanning said map with a beam of light, means for impressing the light passing through said map upon said light sensitive device to convert light intensity to electrical impulses, and a feedback path connected between said light sensitive device and said cathode ray tube to cause degeneration of unwanted signals.

3. A video mapping system comprising in combination, a cathode ray tube having a fluorescent viewing screen and an intensity control electrode, means for causing the cathode ray to scan said screen at a predetermined intensity in a predetermined pattern, a transparency having opaque marking thereon, a photoelectric device for converting light intensity to electrical impulses, means for projecting the light emitted by said screen through said transparency and upon said photoelectric device thereupon to produce electrical impulses varying in accordance with the intensity of said light as seen by said device, and means for impressing said impulses upon said intensity control electrode whereby the light passing through said transparency is maintained substantially constant.

4. A cathode ray mapping system comprising in combination, a cathode ray tube having a viewing screen and an intensity control, electrode means for causing the cathode ray to scan said screen at a predetermined intensity in a predetermined raster, a transparency having opaque markings thereon, a light sensitive device, means for projecting the light emitted by said screen through said transparency and upon said light sensitive device and means responsive to variations in light intensity as seen by said light sensitive device for varying the bias of said intensity control electrode in accordance with said light variations.

5. An arrangement according to claim 4 further comprising a second cathode ray tube, said second cathode ray tube comprising a viewing screen, means for varying the intensity of the ray of said second tube in accordance with the variations in light intensity as seen by said light sensitive device, means for causing the cathode ray of said second tube to scan said last-named screen in a predetermined raster, and means for synchronizing said scanning means.

6. An arrangement comprising a map transparency, a source of scanning light for progressively illuminating different portions of said transparency, a device responsive to the light level of said progressively illuminated portions to provide corresponding signals, and a negative feed back circuit coupling the output of said device to said light source to modify the intensity of the light thereof.

JOHN E. RANKS.

REFERENCES CITED

The following references are of record in the file of this patent:

UNITED STATES PATENTS

| Number | Name | Date |
| --- | --- | --- |
| 2,075,140 | Schlesinger | Mar. 30, 1937 |
| 2,188,679 | Dovaston et al. | Jan. 30, 1940 |